(No Model.)  2 Sheets—Sheet 1.

S. N. CARVALHO.
APPARATUS FOR SUPERHEATING STEAM OR HEATING AIR.

No. 249,502.  Patented Nov. 15, 1881.

WITNESSES:
Carl Kay
Otto Risch

INVENTOR
Solomon N. Carvalho
BY Paul Goepel
ATTORNEY

N. PETERS, Photo-Lithographer, Washington, D. C.

(No Model.) 2 Sheets—Sheet 2.

S. N. CARVALHO.
APPARATUS FOR SUPERHEATING STEAM OR HEATING AIR.

No. 249,502. Patented Nov. 15, 1881.

WITNESSES:
Carl Karp
Otto Risch.

INVENTOR
Solomon N. Carvalho
BY Bruce Goepel
ATTORNEY

N. PETERS, Photo-Lithographer, Washington, D. C.

UNITED STATES PATENT OFFICE.

SOLOMON N. CARVALHO, OF NEW YORK, N. Y., ASSIGNOR TO JACOB S. CARVALHO, OF SAME PLACE.

APPARATUS FOR SUPERHEATING STEAM OR HEATING AIR.

SPECIFICATION forming part of Letters Patent No. 249,502, dated November 15, 1881.

Application filed July 14, 1881. (No model.)

*To all whom it may concern:*

Be it known that I, SOLOMON N. CARVALHO, of the city, county, and State of New York, have invented certain new and useful Improvements in Methods of and Apparatus for Superheating Steam or Heating Air, of which the following is a specification.

The object of this invention is to furnish an improved apparatus for superheating steam or heating air to any desired degree of temperature, and for controlling the same for application in the arts; and the invention consists of a cylindrical retort having an outer casing which has exterior and interior longitudinal ribs, in combination with an interior casing provided with a central diaphragm which passes from the upper end to a point near the bottom of the interior casing, dividing it into equal spaces which communicate with the steam or air conducting pipes at opposite sides of the diaphragm, the interior cylinder being also provided with exterior and interior ribs for the purpose of increasing the heating-surface. For controlling the temperature of the steam and air to be heated a pyrometer or heat-gage is arranged in the steam-eduction pipe, and is connected, by a lever arrangement with a valved air-pipe at the upper part of the exterior casing of the retort, so as to regulate, by the admission of cooler air through a pipe at the lower part of the outer casing, the temperature.

Figure 1:
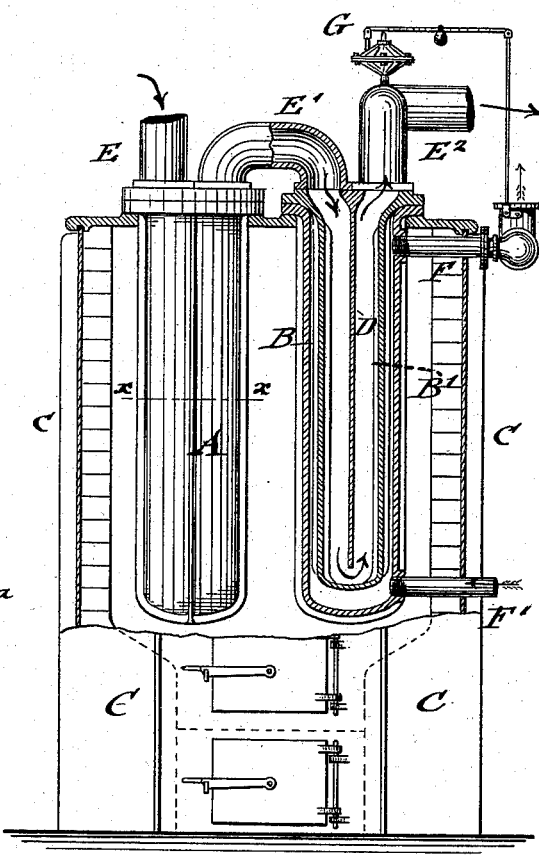
Figure 3:
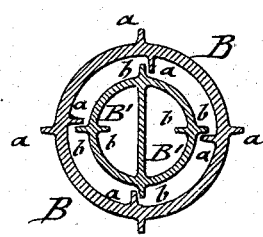
Figure 4:
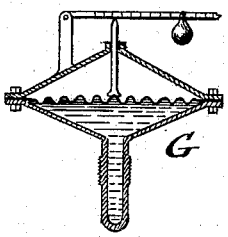
Figure 2:
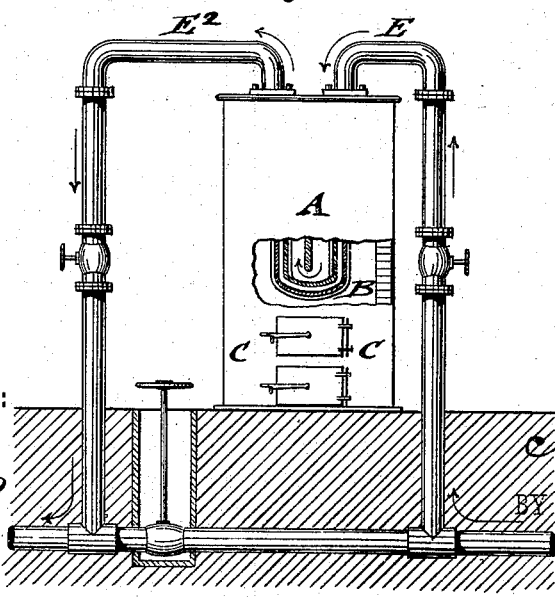
Figure 5:
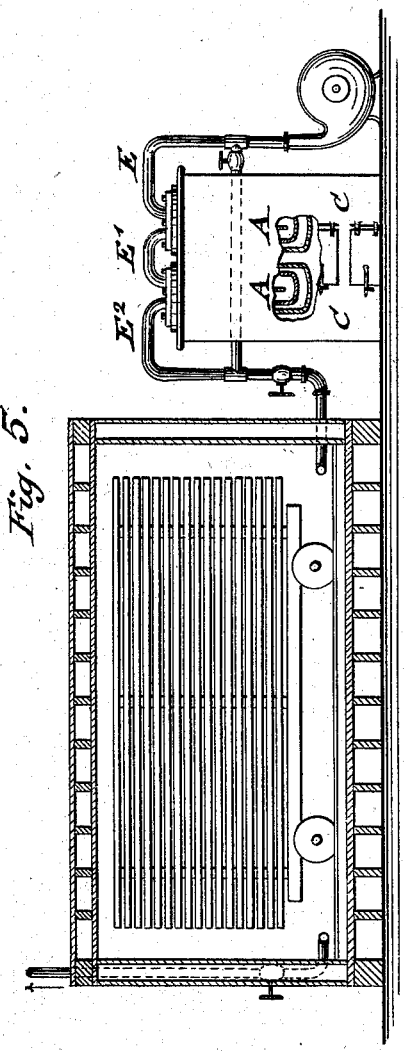
Figure 6:
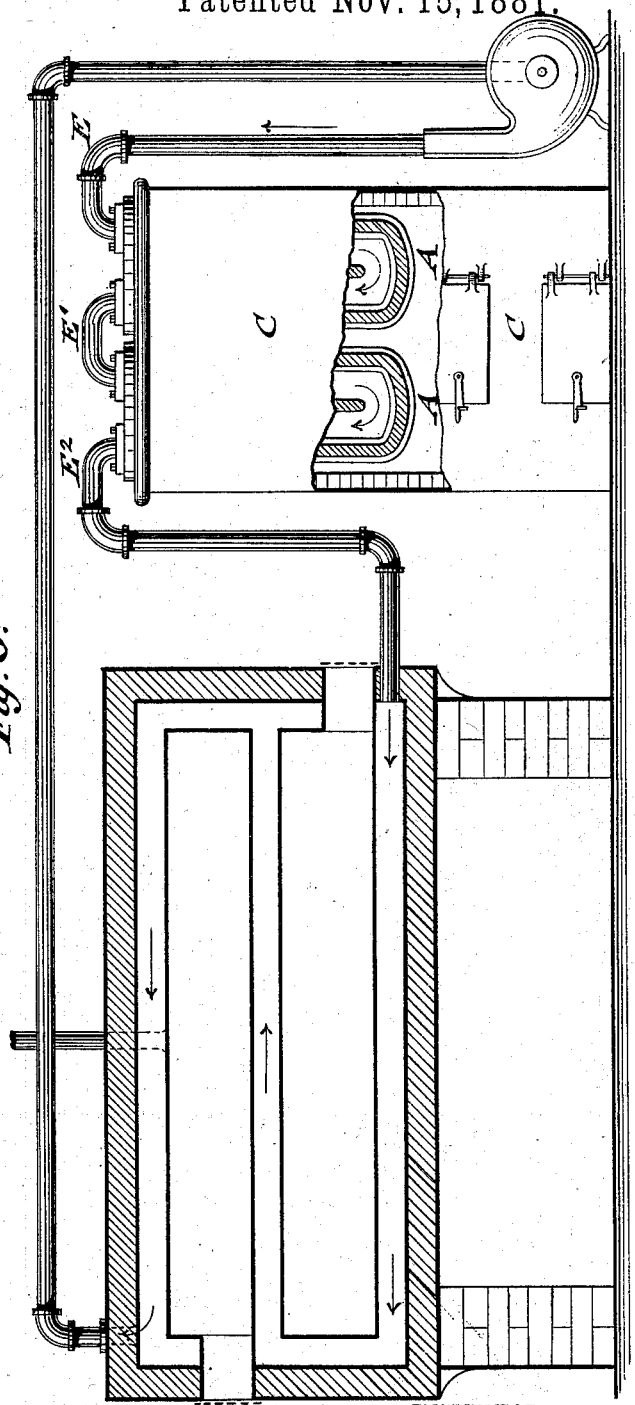

In the accompanying drawings, which fully illustrate my invention, Figure 1 represents a side elevation, partly in section, of my improved apparatus for superheating steam, one retort being shown in side view, the other in vertical central section. Fig. 2 represents a sectional side elevation of the apparatus as applied to an underground steam-conducting pipe. Fig. 3 is a horizontal section of one of the retorts on line $x$ $x$, Fig. 1. Fig. 4 is a vertical central section of the pyrometer or heat-gage employed; and Figs. 5 and 6 are vertical longitudinal sections, showing the application of my improved apparatus for heating air, for drying lumber, and for baking and cooking purposes.

Similar letters of reference indicate corresponding parts.

My improved apparatus for superheating steam or heating air is composed of one or more retorts, A A, which are made preferably of cylindrical shape, and of cast-iron or other suitable material. Each retort A consists of an exterior casing, B, and an interior casing, B', which are both provided with longitudinal ribs $a$ at the outside and inside, as shown in Figs. 1 and 3. The ribs $a$ or $b$ of one casing may be placed in contact with those of the other casing, so as to furnish a larger heat absorbing and conducting surface.

The retorts may be arranged in battery, and are heated by the fire from a furnace, C, by the brick walls of which the retorts are supported.

The interior casing, B', of each retort is divided into two semi-sections by a central longitudinal diaphragm, D, which extends from the upper end to some distance from the bottom of the casing. The steam or air to be heated passes through an induction-pipe, E, to the interior casing, B', at one side of the diaphragm D, and around the lower edge of the latter to the other side of the casing, and from the upper part of the inner casing through a connecting-pipe, E', to the next retort, and so on through all the retorts until finally carried off by the eduction-pipe $E^2$. The upper ends of the inner casing are preferably somewhat enlarged, so as to be properly attached to the steam or air conducting pipes E E' $E^2$.

The air which fills the annular space between the inner and outer cylinder of each retort is heated by the fire in the furnace C below the same, the intermediate body of air preventing the direct contact of the fire with the inner casing, and consequently protecting the same against the injurious effect of the direct fire. It furnishes thereby a permanent, reliable, and economically-working apparatus for the superheating of steam and heating of air, and for adding thereto as many units of extra heat as may be required.

In connection with the annular space between the two cylinders are used regulating air outlet and inlet pipes F F', near the top and bottom of the outer casing, of which the upper pipe, F, is closed by a valve that is connected by a crank-arm and lever-rod with the weighted lever-arm of a pyrometer or heat-gage, G, arranged in the eduction-pipe $E^2$ of the apparatus.

The pyrometer is shown in detail in Fig. 4, and consists of a corrugated diaphragm, upon the lower surface of which acts a body of mercury or other expanding metal, the expansion of the mercury operating the diaphragm; and by a vertically-guided spindle the lever-arm, which actuates the valve of the air-pipe F. By adjusting the pyrometer or heat-gage to a certain temperature it will automatically operate the valve of the air-outlet pipe F whenever the required temperature is reached, so as to cause the escape of some of the air of high temperature from the space between the cylinders through pipe F and the entrance of a supply of cold air through the lower pipe, F'. This will reduce the temperature and regulate in this manner automatically the exact degree to which the steam or air is to be heated.

When the apparatus is connected with underground or other conducting-pipes, such as are proposed for heating cities, &c., as shown in Fig. 2, it will superheat the saturated steam and send it forward to a considerable distance before condensation can take place. In this manner the number of stations having steam-generating cylinders may be reduced by the interposition of auxiliary superheating-stations.

When the apparatus is used for heating air for very high or indefinite temperatures it may be used without the exterior casing, if desired. The apparatus may be used for many different purposes besides for superheating steam—as, for instance, for heating air, in which case a continuous current is forced through the retorts by means of a suitable air-forcing apparatus, then conducted into a closed and airtight chamber for drying lumber, wool, or other articles. The chamber is also provided with circulating-pipes having regulating valves or dampers, and with valves and pipes for admitting cold air for cooling the chamber after drying, as shown in Fig. 5.

For baking or cooking purposes jacketed ovens are used, as shown in Fig. 6, and the air is returned to the air-forcing apparatus for repeated use. Air heated in this manner to high temperatures may be employed for many other applications in the arts.

Having thus described my invention, I claim as new and desire to secure by Letters Patent—

1. In an apparatus for superheating steam or heating air, a retort composed of an exterior and an interior casing, the latter provided with a longitudinal diaphragm which extends centrally through it to a point at some distance from the bottom of the same, substantially as set forth.

2. In an apparatus for superheating steam or heating air, a retort composed of an interior and an exterior casing, the former having a central longitudinal diaphragm extending to a point at some distance from the bottom, both casings being provided with longitudinal ribs for increasing the heating-surface, substantially as specified.

3. In an apparatus for superheating steam or heating air, the combination, with a retort composed of an interior and an exterior casing, of inlet and outlet pipes connected to the outer casing, and mechanism whereby the temperature to which the steam or air which is to be heated is controlled by the admission of cold air, substantially as specified.

In testimony that I claim the foregoing as my invention I have signed my name, in presence of two witnesses, this 6th day of July, 1881.

SOLOMON N. CARVALHO.

Witnesses:
PAUL GOEPEL,
CARL KARP.